June 22, 1954

R. ADLER 2,681,994

HARMONIC GENERATOR

Filed Sept. 27, 1949

ROBERT ADLER
*INVENTOR.*

BY Francis W. Crotty

HIS ATTORNEY

Patented June 22, 1954

2,681,994

UNITED STATES PATENT OFFICE 2,681,994

HARMONIC GENERATOR

Robert Adler, Chicago, Ill., assignor to Zenith Radio Corporation, a corporation of Illinois Application September 27, 1949, Serial No. 118,074

7 Claims. (Cl. 250—36)

Figure 1:
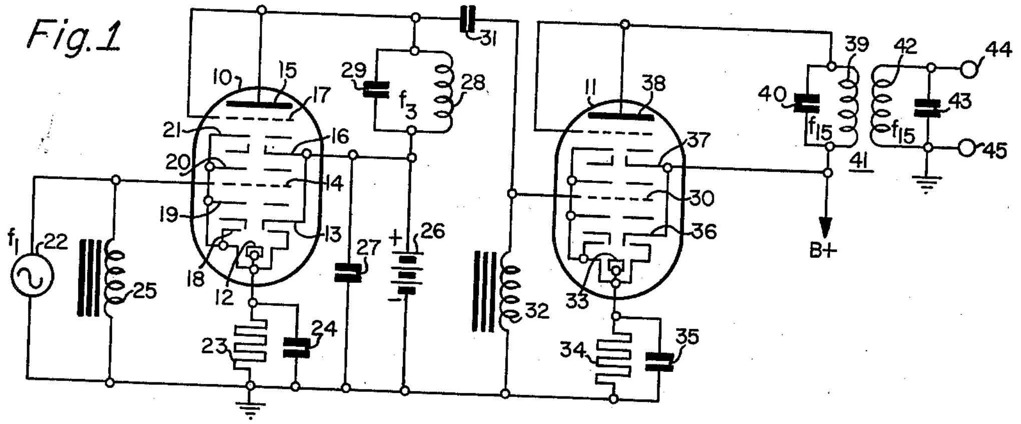

This invention relates to harmonic generators and more particularly to such generators of the electronic type useful for example, as frequency multipliers or the like.

Conventional electronic harmonic generators of the prior art comprise, for example, an electron-discharge device of the high-impedance type, such as a pentode or beam power tube, biased beyond cut-off for class C operation. A signal of a predetermined frequency is impressed on the input of such a device, and the output circuit is tuned to the desired harmonic of the input frequency. The duty cycle of the device depends on the ratio between the applied bias and the bias required for cut-off, and the optimum ratio varies with the desired harmonic, as is well known in the art.

With such a conventional device, operating at constant bias, any amplitude modulation appearing at the input is greatly magnified in the harmonic output. For example, with an operating bias of five times cut-off voltage, a 20% reduction of the input voltage amplitude causes the harmonic output to vanish completely. Furthermore, even if the input signal amplitude is maintained constant, by virtue of the fact that the output circuit of such a multiplier does not receive a driving impulse from the input signal during each cycle of its own resonant frequency, the harmonic output is characterized by an unavoidable amount of amplitude modulation at the input signal frequency. To obtain a useful harmonic output from a multi-stage frequency multiplier comprising a succession of the prior art multiplier stages, therefore, it is generally necessary to remove at least part of this amplitude modulation in any stage by means of a second tuned circuit before entering the next multiplier stage; otherwise, the accentuation of the amplitude modulation by each stage becomes cumulative to the point where the ultimate output signal contains a large number of undesired modulation components of relatively large amplitude. It is particularly necessary to use double-tuned coupling circuits in frequency multipliers used in frequency modulation transmitters and the like where the quality factor or Q of the interstage coupling circuits is limited by the band width requirements.

It is an object of the present invention to provide a novel harmonic generator, operating on a different principle than prior art generators of the type discussed, which is substantially insensitive to amplitude variation of the input signal.

It is a further object of the invention to provide an improved device for generating a signal output of a frequency corresponding to an odd harmonic of the input signal It is another object of the invention to provide a multi-stage harmonic generator, suitable for use as a frequency multiplier in a frequency modulation radio transmitter or the like, which utilizes single-tuned circuits for interstage coupling without being adversely affected by signal amplitude variations in those coupling circuits.

An harmonic generator constructed in accordance with the present invention comprises an electron-discharge device having in the order named a cathode, an accelerating electrode, a control electrode, and an output electrode. The accelerating electrode is operated at a potential positive with respect to the cathode, so that the device has an output electrode current vs. control electrode voltage characteristic comprising two control electrode voltage ranges of substantially zero transconductance separated by a control electrode voltage range of high transconductance. Means are provided for biasing the control electrode to substantially the center of the high-transconductance voltage-range. An input circuit, comprising a source of input signals of a predetermined frequency, is coupled to the control electrode and to the cathode, and an output circuit, selective to an odd harmonic of the predetermined input signal frequency, is coupled to the output electrode and to the cathode.

Figure 2:
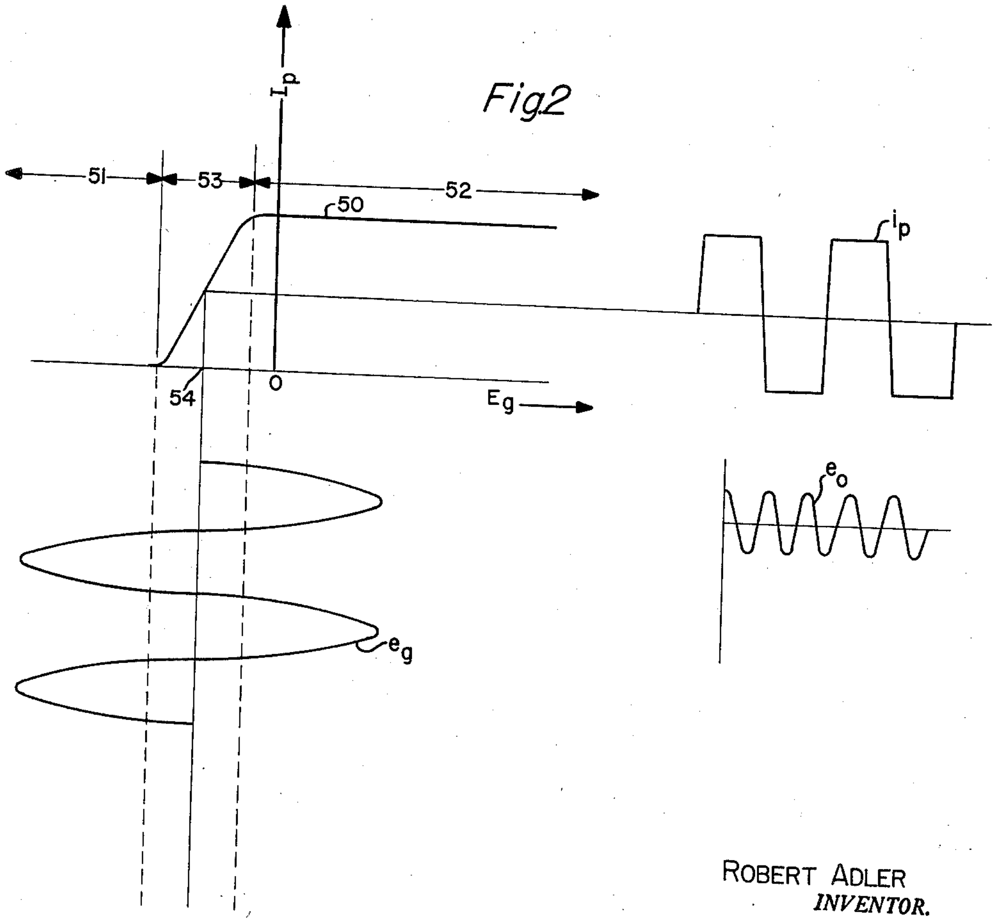

The features of the present invention which are believed to be novel are set forth with particularity in the appended claims. The invention, together with further objects and advantages thereof, may best be understood, however, by reference to the following description taken in connection with the accompanying drawing, in which:

Figure 1 is a schematic circuit diagram of an illustrative embodiment of the invention, and Figure 2 is a graphical representation useful in understanding the operation of the circuit of Figure 1.

In the circuit of Figure 1, a pair of electron-discharge devices 10 and 11 are arranged to provide a cascade-coupled multi-stage harmonic generator. Devices 10 and 11 preferably are of the gated-beam type disclosed and claimed in copending applications of Robert Adler, Serial No. 7864, filed February 12, 1948, for "Electron Discharge Devices," now U. S. Patent 2,511,143, issued June 13, 1950, and Serial No. 68,285, filed December 30, 1948, for "Electron Discharge Devices," now U. S. Patent 2,559,037, issued July 3, 1951, both of which are assigned to the present assignee. For example, devices 10 and 11 may be of the recently-introduced type designated 6BN6, and device 10 may comprise a cathode 12, an accelerating electrode 13, a control grid 14, and an output electrode 15; in addition, the 6BN6 comprises a second accelerating electrode 16, a second control grid 17, and a plurality of focussing electrodes 18, 19, 20 and 21.

An input circuit, comprising a source 22 of input signals of a predetermined frequency $f_1$, is coupled to control electrode 14 and to cathode 12. Cathode 12 is connected to ground through a biasing resistor 23 which is bypassed by means of a condenser 24. Control electrode 14 is returned to ground through a choke 25 which furnishes a low impedance direct current grid return to maintain the bias of that electrode substantially constant and independent of the amplitude of the signal from source 22. Accelerating electrodes 13 and 16 are internally connected together and are connected to the positive terminal of a source of suitable unidirectional operating potential, here shown as a battery 26, which is suitably bypassed by means of a condenser 27; the second accelerator 16 is not essential to the operation of the invention although it is useful for reducing the interelectrode capacity between grid 14 and anode 15. The second control electrode 17, which is not utilized in the operation of the present invention, may be connected to the output electrode or anode 15 as shown, or to ground. Alternatively, second control electrode 17 may be omitted altogether. Anode 15 is coupled to the positive terminal of battery 26 by means of a selective circuit comprising the parallel combination of an inductor 28 and a condenser 29. Inductor 28 and condenser 29 are tuned, for example, to a frequency $f_3$ corresponding to the third harmonic of the frequency $f_1$ of source 22.

Anode 15 of device 10 is also coupled to the control electrode 30 of device 11 by means of a coupling condenser 31, and control electrode 30 is returned to ground by means of a choke 32. The cathode 33 of device 11 is connected to ground through the parallel combination of a biasing resistor 34 and a bypass condenser 35. The accelerating electrodes 36 and 37 of device 11 are connected to the positive terminal of a suitable source of unidirectional operating potential, conventionally designated B+, which may for example be the positive terminal of battery 26. The anode 38 of device 11 is coupled to B+ through the parallel combination of an inductor 39 and a condenser 40 which is tuned, for example, to be selective to a frequency $f_{15}$, corresponding to the fifth harmonic of the frequency $f_3$ to which inductor 28 and condenser 29 are tuned. Inductor 39 and condenser 40 constitute the primary of a double tuned transformer 41. The secondary of transformer 41 comprises the parallel combination of an inductor 42 and a condenser 43 which are also tuned to the frequency $f_{15}$ of the primary. Output terminals 44 and 45 are provided at the terminals of the secondary of transformer 41, and output terminal 45 is connected to ground.

The operation of the circuit of Figure 1 may perhaps best be understood by reference to the graphical representation of Figure 2, in which the output electrode current $I_p$ vs. control electrode voltage $E_g$ characteristic of device 10 is plotted as curve 50. Operating characteristic 50 comprises two voltage ranges 51 and 52 of substantially zero transconductance separated by a control electrode voltage range 53 of high transconductance, as explained in detail in the above-mentioned copending applications. The bias of control electrode 14 is adjusted, as by means of resistor 23 and condenser 24, to a value 54 at substantially the center of high-transconductance voltage-range 53. An input signal $e_g$ of frequency $f_1$ from source 22 is applied to control grid 14. If the peak-to-peak amplitude of input signal $e_g$ is made materially greater than high-transconductance voltage-range 53, as shown, the anode current $i_p$ has a substantially square waveform. Furthermore, the larger the amplitude of the input signal $e_g$, the less the effect of any amplitude variations of the input signal on the waveform of the output current, as is apparent from a consideration of the transfer characteristic of Figure 2.

In practice, while suitable operation may be maintained with a source of input signals of substantially constant peak-to-peak amplitude which is only a small amount greater than the width of the high-transconductance voltage-range 53, it is preferred that the peak-to-peak amplitude of the input signal $e_g$ be at least twice as great as high-transconductance voltage-range 53, and preferably of the order of ten times as great or more.

Since the output current is of a substantially square waveform, it may be resolved by Fourier analysis into a fundamental component and a number of sinusoidal components of frequencies equal to the odd harmonics of the input frequency $f_1$. Since the output circuit comprising inductor 28 and condenser 29 is tuned to be selective to one of these odd harmonics, as for example the third harmonic $f_3$, the voltage $e_0$ developed across this tuned circuit is substantially sinusoidal and has a frequency equal to the third harmonic of the input signal. The impedance of the output circuit at the fundamental frequency and at other harmonic frequencies is negligible, so that anode current components at these frequencies produce no substantial effect on the output voltage.

The voltage $e_0$ developed across the tuned circuit comprising inductor 28 and condenser 29, drawn to a smaller scale than the input voltage $e_g$, is coupled to the control electrode 30 of device 11, which is connected in a similar circuit to provide further frequency multiplication. The operation of the second stage including device 11 is identical with that of the first stage comprising device 10, with the exception that the output circuit including inductor 39 and condenser 40 is tuned to the fifth harmonic $f_{15}$ of the frequency $f_3$ which is applied to control grid 30. Consequently, the output voltage developed between terminals 44 and 45 is of a frequency corresponding to the fifteenth harmonic of the input frequency $f_1$.

Merely by way of illustration, and in no sense by way of limitation, satisfactory operation of the first stage of the frequency multiplier of Figure 1 may be obtained by using a 300-ohm cathode resistor 23 and a 60-volt supply battery 26. The cathode current of device 10 (type 6BN6) is then about 5 ma., so that the bias 54 applied to control grid 14 is about 1.5 volts negative. The input signal $e_g$ from source 22 may have a peak-to-peak amplitude of about 20 volts at a frequency, for example, of 1.5 megacycles. Inductor 28 and condenser 29 are adjusted to have a 20,000-ohm anti-resonant impedance at a frequency of 4.5 megacycles. With these constants, a substantially sinusoidal third harmonic output signal $e_0$ of about 10 volts rms. is obtained across the circuit comprising inductor 28 and condenser 29.

One outstanding advantage of the arrangement of Figure 1 over prior art class C harmonic generators resides in the fact that by virtue of the step function operating characteristic, the output current waveform is substantially unaffected by variations in the input signal amplitude, so long as the peak-to-peak input signal amplitude remains materially greater than the high-transconductance voltage-range 53. Consequently, a single tuned circuit suffices to couple the cascaded stages, whereas the prior art required further filtering in each interstage coupling network, as by means of a double-tuned transformer.

Furthermore, the output circuit is shock excited at a uniform rate of one driving impulse for each half-period of the input signal, whereas in conventional class C multiplier stages, the output circuit is only shock excited at alternate half-periods of the input signal. Therefore, the amount of amplitude modulation appearing in the output circuit of a multiplier stage constructed in accordance with the invention is only half as great as that appearing in the output circuit of the prior art device.

Since the output current waveform is substantially square, it is apparent that the output circuit may be tuned to any desired odd harmonic of the input frequency, and the invention is not to be limited to the specific choice of odd harmonics utilized in the circuit of Figure 1. Furthermore, since the output signal of each stage is substantially insensitive to amplitude variations of the input signal, any desired number of stages may be cascaded to provide further frequency multiplication, and only a single tuned circuit need be used in each of the interstage coupling networks.

As another alternative, instead of connecting the single tuned circuit of the interstage coupling network from anode 15 to the positive terminal of battery 26, a resistive load impedance (not shown) may be connected in the output circuit of device 10 and the choke 32 in the input circuit of the following stage may be replaced by the tuned circuit comprising inductor 28 and condenser 29. As a still further alternative, the output electrode 15 of the first stage may be coupled to the control electrode 30 of the second stage by means of a transformer having primary and secondary windings only one of which need be tuned.

For satisfactory operation of the invention, it is necessary that the output electrode current vs. control electrode voltage characteristic be of the step function variety having two control electrode voltage ranges of substantially zero transconductance separated by a control electrode voltage range of high transconductance. Such a characteristic may also be obtained, for example, by operating a conventional pentagrid converter tube with the third grid used as control electrode and the second grid used as accelerating electrode, and with a fixed bias applied to the first grid. It is, however, preferred to utilize a tube of the general type disclosed in the aforementioned copending applications and exemplified by the commercially available type 6BN6, since such a device affords a particularly high transconductance which more nearly approaches the ideal characteristic; the term "gated-beam electron-discharge device," where used in the appended claims, is intended to be restrictive to a device of this type.

While a particular embodiment of the present invention has been shown and described, it is apparent that various changes and modifications may be made, and it is therefore contemplated in the appended claims to cover all such changes and modifications as fall within the true spirit and scope of the invention.

I claim:

1. An harmonic generator comprising: an electron-discharge device having in the order named a cathode, an accelerating electrode, a control electrode, and an output electrode; means for operating said accelerating electrode at a potential positive with respect to said cathode, whereby said device has an output electrode current vs. control electrode voltage characteristic comprising two control electrode voltage ranges of substantially zero transconductance separated by a control electrode voltage range of high transconductance; means for biasing said control electrode to substantially the center of said high-transconductance voltage-range; an input circuit coupled to said control electrode and to said cathode and comprising a source of input signals of a predetermined frequency; and an output circuit coupled to said output electrode and to said cathode and selective to an odd harmonic of said predetermined frequency.

2. An harmonic generator comprising: a gated-beam electron-discharge device having an electrode system including in the order named a cathode, an accelerating electrode, a control electrode, and an output electrode; means for operating said accelerating electrode at a potential positive with respect to said cathode, whereby said device has an output electrode current vs. control electrode voltage characteristic comprising two control electrode voltage ranges of substantially zero transconductance separated by a control electrode voltage range of high transconductance; a source of bias potential for biasing said control electrode to substantially the center of said high-transconductance voltage-range; an input circuit coupled to said control electrode and to said cathode and comprising a source of input signals of a predetermined frequency; and an output circuit coupled to said output electrode and to said cathode and selective to an odd harmonic of said predetermined frequency.

3. An harmonic generator comprising: an electron-discharge device having in the order named a cathode, an accelerating electrode, a control electrode, and an output electrode; means for operating said accelerating electrode at a potential positive with respect to said cathode, whereby said device has an output electrode current vs. control electrode voltage characteristic comprising two control electrode voltage ranges of substantially zero transconductance separated by a control electrode voltage range of high transconductance; means for biasing said control electrode to substantially the center of said high-transconductance voltage-range; an input circuit coupled to said control electrode and to said cathode and comprising a source of input signals of a predetermined frequency and of a peak-to-peak amplitude materially greater than said high-transduction voltage-range; and an output circuit coupled to said output electrode and to said cathode and selective to an odd harmonic of said predetermined frequency.

4. An harmonic generator comprising: a gated beam electron-discharge device having in the order named a cathode, a first accelerating electrode, a control electrode, a second accelerating electrode, and an output electrode; means for operating each of said accelerating electrodes at a potential positive with respect to said cathode, whereby said device has an output electrode current vs. control electrode voltage characteristic comprising two control electrode voltage ranges of substantially zero transconductance separated by a control electrode voltage range of high transconductance; means for biasing said control electrode to substantially the center of said high-transconductance voltage-range; an input circuit, coupled to said control electrode and to said cathode, comprising a source of input signals of a predetermined frequency and of a peak-to-peak amplitude materially greater than said high-transconductance voltage-range and having a low direct-current impedance; and an output circuit coupled to said output electrode and to said cathode and selective to an odd harmonic of said predetermined frequency.

5. An harmonic generator comprising: a pair of electron-discharge devices each having in the order named a cathode, an accelerating electrode, a control electrode, and an output electrode; means for operating the accelerating electrode of each of said devices at a potential positive with respect to its associated cathode, whereby each of said devices has an output electrode current vs. control electrode voltage characteristic comprising two control electrode voltage ranges of substantially zero transconductance separated by a control electrode voltage range of high transconductance; means for biasing the control electrode of each of said devices to substantially the center of its high-transconductance voltage-range; an input circuit coupled to the control electrode and to the cathode of one of said devices and comprising a source of input signals of a predetermined frequency; a network comprising a single selective circuit tuned to a frequency substantially equal to an odd harmonic of said predetermined frequency for coupling the output electrode of said one device to the control electrode of the other of said devices; and an output circuit coupled to the output electrode and to the cathode of said other device and selective to an odd harmonic of the frequency of said single selective circuit.

6. An harmonic generator comprising: a pair of electron-discharge devices each having in the order named a cathode, an accelerating electrode, a control electrode, and an output electrode; means for operating the accelerating electrode of each of said devices at a potential positive with respect to its associated cathode, whereby each of said devices has an output electrode current vs. control electrode voltage characteristic comprising two control electrode voltage ranges of substantially zero transconductance separated by a control electrode voltage range of high transconductance; means for biasing the control electrode of each of said devices to substantially the center of its high-transconductance voltage-range; an input circuit coupled to the control electrode and to the cathode of one of said devices and comprising a source of input signals of a predetermined frequency; a network comprising a single selective circuit tuned to a frequency substantially equal to an odd harmonic of said predetermined frequency and coupled to the output electrode and to the cathode of said one device, and means for coupling said circuit to the control electrode and to the cathode of the other of said devices; and an output circuit coupled to the output electrode and to the cathode of said other device and selective to an odd harmonic of the frequency of said single selective circuit.

7. An harmonic generator comprising: a pair of gated-beam electron-discharge devices each having an electrode system including in the order named a cathode, an accelerating electrode, a control electrode, and an output electrode; means for operating the accelerating electrode of each of said devices at a potential positive with respect to its associated cathode, whereby each of said devices has an output electrode current vs. control electrode voltage characteristic comprising two control electrode voltage ranges of substantially zero transconductance separated by a control electrode voltage range of high transconductance; means for biasing the control electrode of each of said devices to substantially the center of its high-transconductance voltage-range; an input circuit coupled to the control electrode and to the cathode of one of said devices and comprising a source of input signals of a predetermined frequency and of a peak-to-peak amplitude materially greater than said high-transconductance voltage-range; a network comprising a single selective circuit tuned to a frequency substantially equal to an odd harmonic of said predetermined frequency for coupling the output electrode of said one device to the control electrode of the other of said devices; and a double-tuned output circuit coupled to the output electrode and to the cathode of said other device and selective to an odd harmonic of the frequency of said single selective circuit.

References Cited in the file of this patent

UNITED STATES PATENTS

| Number | Name | Date |
|---|---|---|
| 1,962,392 | Harmon | June 12, 1934 |
| 2,427,204 | Ferguson | Sept. 9, 1947 |
| 2,428,989 | Pulliam | Oct. 14, 1947 |
| 2,455,824 | Tellier et al. | Dec. 7, 1948 |
| 2,482,803 | Smith, Jr., et al. | Sept. 27, 1949 |
| 2,510,129 | Moore | June 6, 1950 |
| 2,541,378 | Nyquist | Feb. 13, 1951 |